United States Patent [19]

Nakazawa

[11] Patent Number: 5,754,547
[45] Date of Patent: May 19, 1998

[54] ROUTING METHOD AND SYSTEM USING AN INTERNET PROTOCOL

[75] Inventor: Fumio Nakazawa, Tokyo, Japan

[73] Assignee: NEC Corporation, Tokyo, Japan

[21] Appl. No.: 638,557

[22] Filed: Apr. 26, 1996

[30] Foreign Application Priority Data

May 16, 1995 [JP] Japan ................... 7-117165

[51] Int. Cl.⁶ ........................... H04L 12/46
[52] U.S. Cl. ................. 370/401; 370/420; 370/911; 395/200.79
[58] Field of Search ............... 370/401, 402, 370/338, 911, 420, 463; 395/309, 200.79

[56] References Cited

U.S. PATENT DOCUMENTS

| | | | |
|---|---|---|---|
| 5,159,592 | 10/1992 | Perkins | 370/338 |
| 5,309,437 | 5/1994 | Perlman et al. | 370/402 |
| 5,327,424 | 7/1994 | Perlman | 370/401 |
| 5,345,448 | 9/1994 | Keskitalo | 370/331 |
| 5,353,283 | 10/1994 | Tsuchiya | 370/392 |
| 5,461,624 | 10/1995 | Mazzola | 370/402 |
| 5,490,139 | 2/1996 | Baker et al. | 370/401 |
| 5,533,026 | 7/1996 | Ahmadi et al. | 370/338 |
| 5,572,528 | 11/1996 | Shuen | 370/338 |
| 5,608,871 | 3/1997 | Murono | 370/402 |
| 5,640,400 | 6/1997 | Sato et al. | 370/401 |

*Primary Examiner*—Benedict V. Safourek
*Assistant Examiner*—Seema S. Rao
*Attorney, Agent, or Firm*—Young & Thompson

[57] ABSTRACT

Routing methods, using an Internet protocol, which allows free alteration of the connection of a terminal between subnetworks such as local area networks (LANs) without necessitating modification of IP (Internet Protocol) addresses. The subnetworks are unified to constitute a network by a plurality of routers and each router is provided with a table which stores information according to every router indicating terminal addresses and times of connection to the network for every terminal included within the network. When a terminal is connected to any one of the subnetworks, the router corresponding to that subnetwork both updates the content of the table incorporated in that router and communicates to other routers the address and connection time of the connected terminal by means of a subscriber signal. A router which receives the subscriber signal updates the table incorporated in that router based on the results of comparing the connection time within the subscriber signal with the connection time within its own table.

6 Claims, 4 Drawing Sheets

| ROUTER | IP ADDRESS | CONNECTION TIME |
|---|---|---|
| ROUTER (C) | # 128.1.1.2 ⋮ | 1994.12.24.10.20 ⋮ |
| ROUTER (A) | ⋮ | ⋮ |
| ROUTER (B) | # 128.1.1.1 ⋮ | 1994.12.24.13.30 ⋮ |

ROUTING METHOD AND SYSTEM USING AN INTERNET PROTOCOL

BACKGROUND OF THE INVENTION

1. Field of the Invention

The present invention relates to a routing method and system using an Internet protocol that perform routing control between a plurality of networks.

2. Description of the Related Art

In a case in which a plurality of networks such as local area networks (LANS) are interconnected by means of routing devices (routers), various methods such as fixed routing method employing subnetwork addresses or Routing Information Protocol (RIP) as described in RFC (Request For Comments) 1058 are available as routing control methods for establishing a connection between a terminal connected to one network and a terminal connected to another network. In the fixed routing method using subnetwork addresses, communication is realized by selecting a routing device corresponding to a value that is the logical product of a bit pattern known as a subnetwork mask and the IP (Internet Protocol) address of the terminal that is communication destination. In RIP, on the other hand, a routing device communicates to each local area network the IP addresses of terminals that are open for communication, thereby enabling selection of a routing device to the destination terminal.

The above-described routing methods of the prior art suffer from several drawbacks. In the fixed routing method using subnetwork addresses, the IP address of a terminal must include a value that depends on the subnetwork address of the network to which the terminal belongs, and this requirement imposes some limitations on assigning addresses to a terminal device. Moreover, if a terminal is moved from one subnetwork to another subnetwork, the IP address of that terminal must be modified. On the other hand, when using RIP, the terminal address information of all terminals is broadcast over the local area network at a prescribed timing, and this type of broadcast decreases the working efficiency of the network. The network must be converted to groups and a subnetwork mask employed to improve the working efficiency, and this entails the same problems as described hereinabove with regard to the fixed routing method.

SUMMARY OF THE INVENTION

The object of the present invention is therefore to provide a routing method using an Internet protocol that allows free alteration of the connection of a terminal between networks without necessitating modification of IP addresses.

Another object of the present invention is to provide a routing system using an Internet protocol that allows free alteration of the connection of a terminal between networks without necessitating the modification of IP addresses.

The first object of the present invention can be achieved by an Internet protocol routing method in a network composed of a plurality of subnetworks unified by a plurality of routing devices, wherein: a table is provided in each routing device that stores information according to every routing device indicating terminal addresses and times of connection to the network for every terminal included within the network; when a terminal is connected to any one of the subnetworks, the routing device corresponding to that subnetwork both updates the content of the table incorporated in that routing device and communicates to other routing devices the address and connection time of the connected terminal by means of a subscriber signal; and a routing device that receives the subscriber signal updates the table incorporated in that routing device based on the results of comparing the connection time within the subscriber signal with the connection time within the table incorporated in that routing device.

The second object of the present invention can be achieved by an Internet protocol routing system employed in constituting a network in which a plurality of subnetworks are combined that is characterized by including a plurality of routing devices provided for mutually connecting the subnetworks and tables provided for each of the routing devices for storing according to every routing device the terminal address and connection times for every terminal included within the network; wherein, when one of the terminals is connected to a subnetwork connected to any one routing device, the content of the table incorporated in the routing device connected to the terminal is updated, and the address and connection time of the terminal are communicated to other routing devices as subscriber information; and the table incorporated in a routing device that receives the subscriber information is updated based on results of comparing the connection time within the table with the connection time within the subscriber information.

In the present invention, a table is provided in each routing device making up the network that stores the IP addresses of terminals connected to the network and the connection times of those terminals; when a terminal is connected to the network, the address and connection time of that terminal are communicated to each routing device as subscriber information; and in a routing device that receives the subscriber information, the table incorporated in that routing device is updated through a comparison of connection times. Updating tables in this way enables accurate routing control without modifying the IP address even when the connections of a terminal are changed between subnetworks.

The above and other objects, features, and advantages of the present invention will become apparent from the following description based on the accompanying drawings which illustrate an example of a preferred embodiment of the present invention.

DESCRIPTION OF THE PREFERRED EMBODIMENTS

Figures 1, 2:
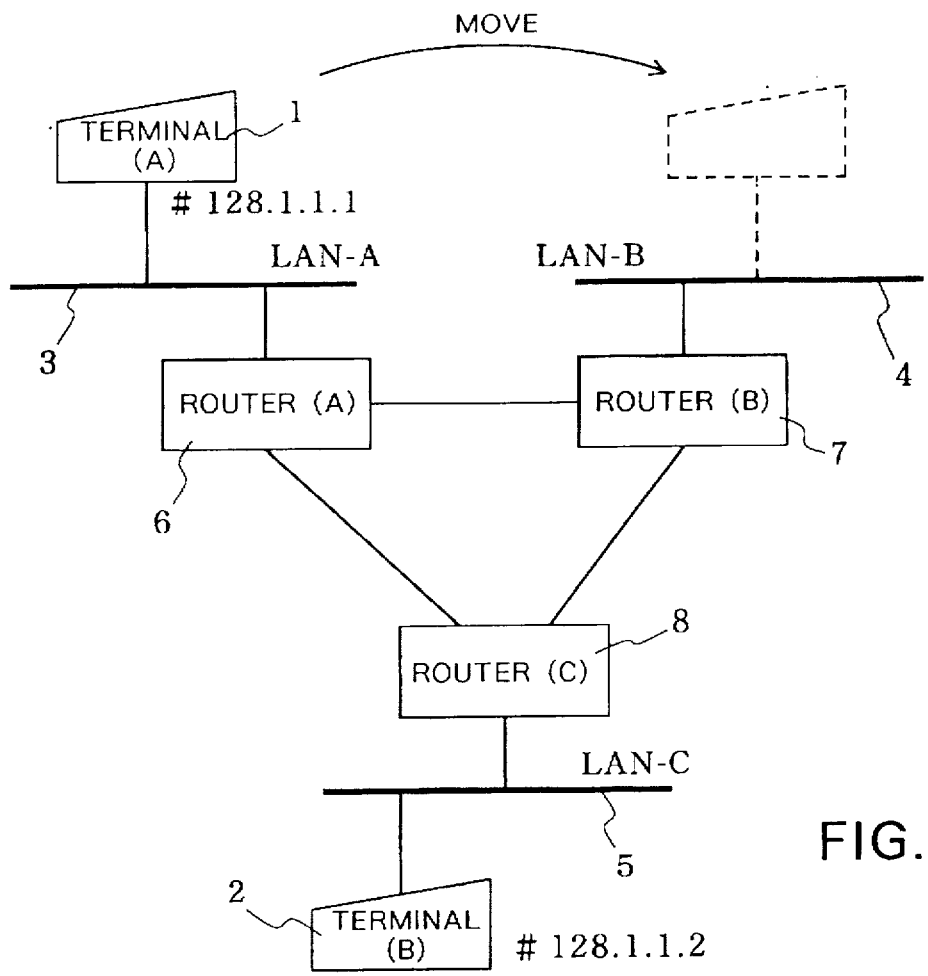
FIG. 1 is a block diagram showing a network in which the routing device of one embodiment of the present invention is applied.
FIG. 2 shows an example of the content of the table provided in the routing device.

The network shown in FIG. 1 is divided between three local area networks (LAN-A 3, LAN-B 4, and LAN-C 5), which are subnetworks, and local area networks (LANs) 3–5 are connected to routing devices, router (A) 6, router (B) 7, and router (C) 8, respectively. Routers 6–8 are interconnected, and LANs 3–5 therefore together constitute a single network.

Each of routers 6–8 are provided with tables 10 which record the IP (Internet Protocol) addresses and connection times for every terminal connected to the network. In tables 10, the terminals are recorded collectively according to the routing device corresponding to the LAN to which the terminals are connected. The connection times indicate the times at which a terminal was connected to the network. When the LANs are in a stable state, the contents of these tables 10 are identical regardless of which of routers 6–8 that incorporate the table. With each new connection of a terminal to a LAN, the router controlling the LAN to which the terminal is connected responds by both updating its own table 10 and broadcasting to other routers on the network that a terminal has been newly connected to the network. Each of the routers additionally updates tables 10 when receiving such a broadcast from other routers on the network. The present embodiment is further constructed so as to guarantee conformity of the contents of tables 10 among the routers through periodic exchange of the contents of tables 10 by routers 6–8.

Figure 3:
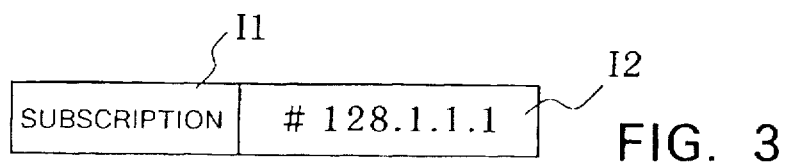
FIG. 3 shows one example of a connection signal.
Figure 4:
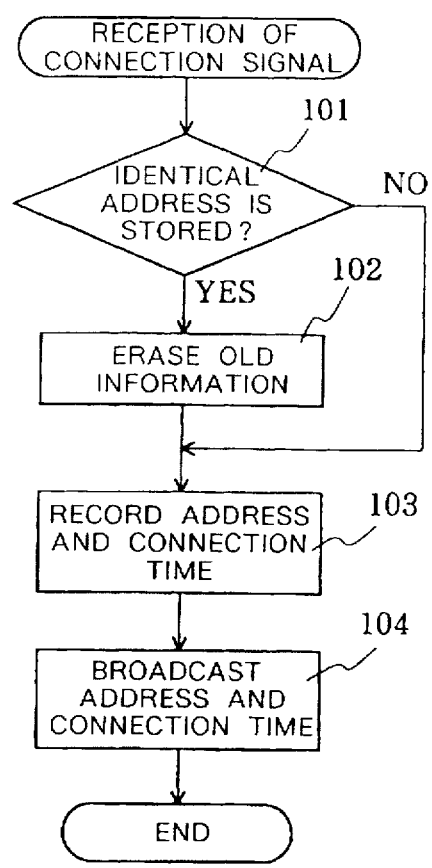
FIG. 4 is a flow chart showing the reception process of a connection signal.

As an example, terminal (A) 1 having IP address #128.1.1.1 is connected to LAN-A 3, and terminal (B) 2 having IP address 128.1.1.2 is connected to LAN-C 5. The content of table 10 in each of routers 6–8 at this time is shown in FIG. 2. The operation taking place when terminal (A) 1 is moved from LAN-A 3 to LAN-B 4 can be explained as follows:

When terminal (A) 1 is connected to LAN-B 4, the connection of this terminal (A) to the LAN is communicated to the router directly connected to that LAN by means of a connection signal. In this case, a connection signal indicating the connection of terminal (A) 1 is inputted to router (B) 7. FIG. 3 shows one example of a connection signal. For conveying information, this connection signal is allotted a code I1 indicating "subscription" to the network and IP address I2 of the terminal that outputs the connection signal. Router (B) 7, which receives this connection signal, executes a connection signal reception process shown in FIG. 4.

Figure 5:
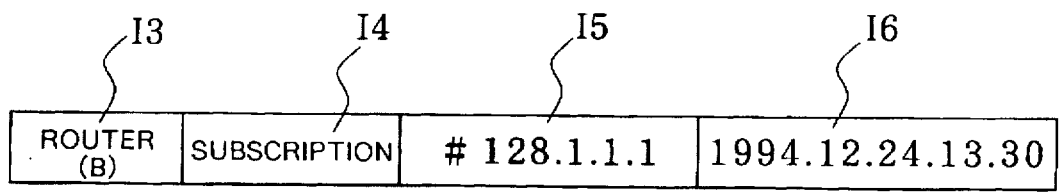
FIG. 5 shows one example of a subscriber signal.

In the connection signal reception process, router (B) 7 first investigates whether an IP address identical to the IP address of the subscribing terminal (A) 1 is stored within its own table 10 (Step 101), and if the identical IP address exists, erases the old information within table 10 (Step 102). Router (B) 7 then newly stores the IP address and connection time informed by the connection signal in its own table 10 (Step 103). The existence of a new subscriber is communicated to other routers (A) 6 and (C) 8 by broadcasting a subscriber signal (Step 104). FIG. 5 shows an example of a subscriber signal. A subscriber signal contains information field I3 specifying the router which is the sending source of the subscriber signal, signal classification field I4, the IP address field I5 of the newly connected terminal, and the connection time field I6 of the terminal. The content of table 10 of router (B) 7 assumes the form shown in FIG. 6 through the above-described connection signal reception process. In other words, the IP address and connection time of terminal (A) 1 within the area of router B is newly stored.

Figures 6, 7:
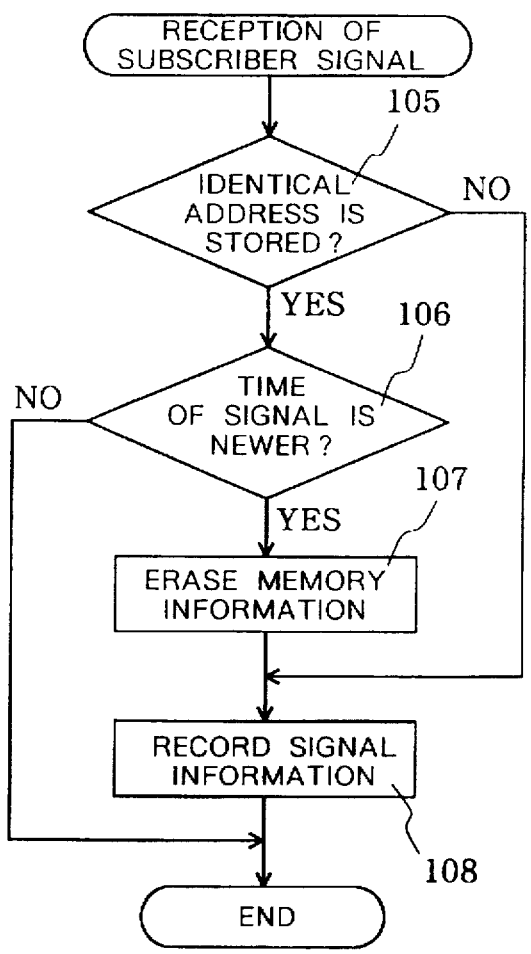
FIG. 6 shows an example of the content of a table following the reception process of a connection signal.
FIG. 7 is a flow chart showing the reception process of a subscriber signal.
Figure 8:
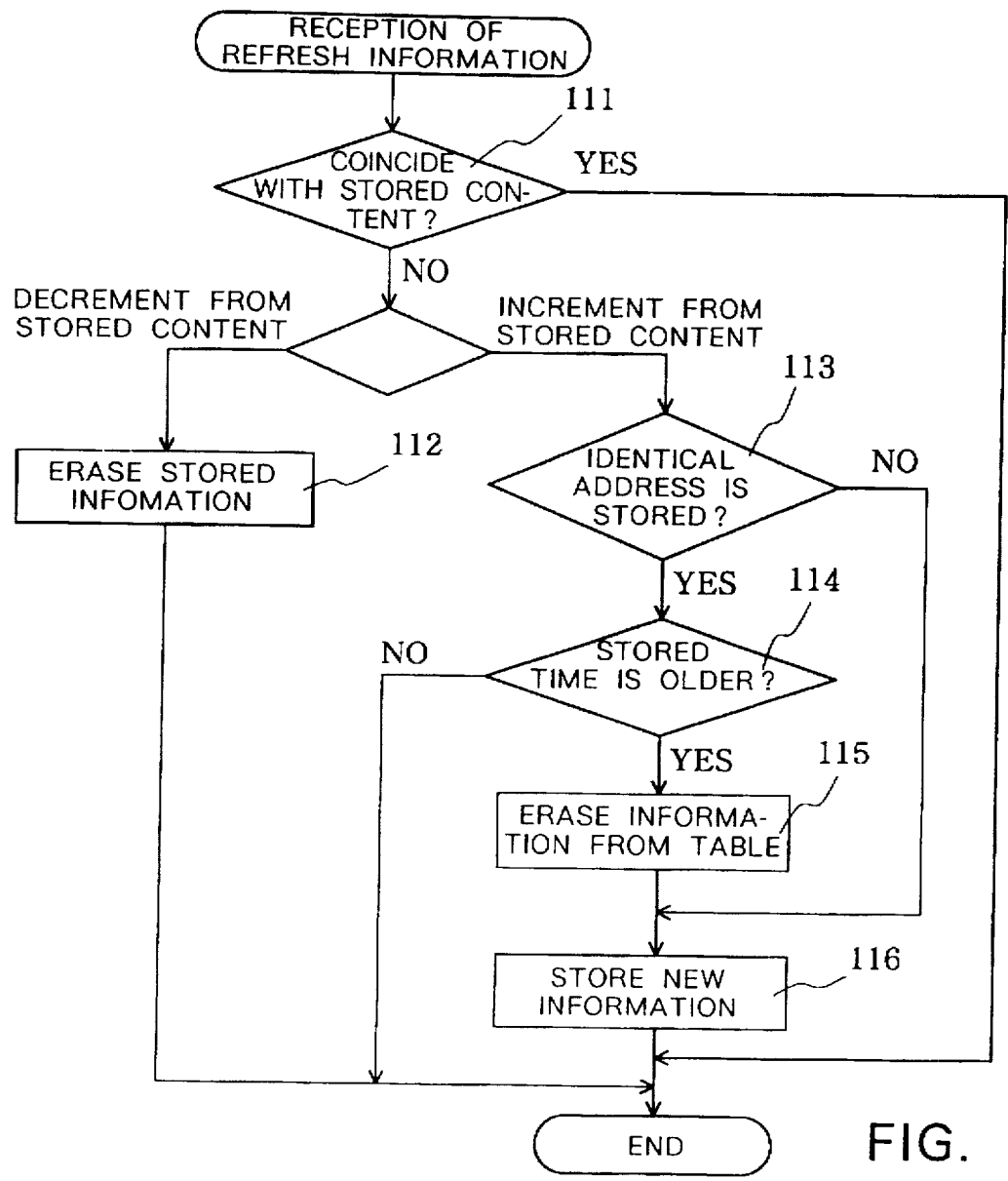
FIG. 8 is a flow chart showing the reception process of refresh information.

When the subscriber signal is broadcast in this way, a subscriber signal reception process is executed as shown in FIG. 7 at router (A) 6 and router (C) 8 that receive this subscriber signal. According to this subscriber signal reception process, it is first determined at router (A) 6 and router (C) 8 whether the IP address within the subscriber signal exists in the area of any router contained in tables 10 incorporated in these routers (Step 105). If the same IP address is not present, the process shifts to Step 108, but if the same IP address is present within tables 10, it is then determined whether the connection time stored in tables 10 is newer than the connection time within the subscriber signal (Step 106). If the connection time within the subscriber signal is newer, the information (memory information) within table 10 relating to the IP address and connection time is erased (Step 107), and the process advances to Step 108. If the connection time within the table is newer, the process ends with no need for updating. In Step 108, the IP address and connection time within the subscriber signal are recorded in table 10 within the area for the source router, and the subscriber signal reception process is completed. According to the above-described process, the contents of tables 10 of router (A) 6 and router (C) 8 each assume the form shown in FIG. 6.

In a network according to the present embodiment, the IP addresses and connection times of terminals included within LANs 3–5 under the jurisdiction of each of the routers 6–8 are transmitted to other routers, and the contents of the tables of the routers receiving this transmission are updated, thereby enabling consistency of information among routers 6–8. These processes are collectively referred to as a refresh process. Through the refresh process, each of routers 6–8 periodically broadcasts as refresh information to the other routers the content of that portion of the content of table 10 shown in FIG. 3 relating to that router.

FIG. 7 is a flow chart showing the process at a router that has received such refresh information, i.e., a refresh information reception process. The received content is first checked to determine consistency with the content of table 10 incorporated in that router (Step 111). In the event of matching, i.e., if there is no discrepancy, the process ends with no further action taken. In this case, the object of comparison in table 10 is limited to that portion of the router that corresponds to the refresh information. In the event of a discrepancy, if an IP address exists in table 10 but not in the refresh information, the information relating to the IP address is erased from the content stored in table 10 (Step 112). Regarding the router that corresponds to the refresh information, if an IP address is included in the refresh information but not in table 10, it is determined whether the terminal indicated by the IP address in table 10 is included within the area of a different router than the broadcast source of the refresh information (Step 113). If the IP address is not stored in relation to other routers, the process moves to Step 116, and if the IP address is stored in relation to other routers, the connection time within table 10 for that IP address is compared with the connection time in the received refresh information (Step 114). The process ends if the connection time of the received refresh information is older, but if the time stored in table 10 is older, the content relating to that IP address stored in table 10 is erased (Step 115) and the process advances to Step 116. In Step 116, the IP address and connection time are stored in table 10 in accordance with the content of the received refresh information.

By periodically carrying out the above-described process, conformity of the tables 10 among each of routers 6–8 can be reliably maintained.

In the network as described hereinabove, routing control can be accurately performed without modifying IP addresses regardless of changes in the connections of a terminal among LANs. Accordingly, a terminal can be freely interconnected among LANs without the constraints of an address system such as subnetwork addresses.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A routing method in a network, using an Internet protocol, composed of a plurality of subnetworks unified by a plurality of routing devices, wherein a table is provided in each of the routing devices that stores information pertaining to each of the routing devices indicating terminal addresses and times of connection to the network for every terminal included within the network;

when a terminal is connected to any one of said subnetworks, the routing device corresponding to that subnetwork both updates the content of said table incorporated in that routing device and communicates to other of the routing devices the address and connection time of said connected terminal by means of a subscriber signal; and each of the other routing devices that receives said subscriber signal updates the table incorporated in that routing device based on results of a comparison of the connection time within said subscriber signal with the connection time within its own table.

2. A routing method according to claim 1 wherein said address of the connected terminal is an Internet Protocol (IP) address.

3. A routing method according to claim 1 wherein:

said routing devices each periodically communicate to other of the routing devices as refresh information a portion of the content of said table incorporated in that routing device that related to that routing device; and each of the other routing devices receiving said refresh information updates the table incorporated in that routing device based on results of a comparison of the connection time within the table of that routing device with the connection time within the table of that refresh information.

4. A routing method according to claim 1 wherein said connected terminal, upon connecting to said network, transmits to said network a connection signal comprising a code indicating "subscription" to the network and an IP address of that terminal.

5. A routing system employed in constituting a network, using an Internet protocol, in which a plurality of subnetworks are combined, characterized by comprising:

a plurality of routing devices provided for mutually connecting the subnetworks, and tables provided for each of said routing devices for storing information pertaining to every routing device including the terminal address and connection times for each of a plurality of terminals included within the network;

wherein, when one of said terminals is connected to one of the subnetworks connected to any one of said routing devices, content of said table provided for the routing device connected to the terminal is updated, and the address and connection time of that terminal are communicated to other of the routing devices as subscriber information; and the table incorporated in each of the other routing devices that receives said subscriber information is updated based on results of a comparison of the connection time within the table with the connection time within said subscriber information.

6. A routing system according to claim 5 wherein each of said routing devices periodically communicates, to said other routing devices, a portion of the content of said table provided for that routing device which relates to that routing device as refresh information; and each of said other routing devices receiving said refresh information updates the table incorporated in that routing device based on results of a comparison of the connection times within the table in that routing device with connection times communicated as said refresh information.

* * * * *